(12) United States Patent
Schytte (10) Patent No.: US 6,421,949 B1
(45) Date of Patent: Jul. 23, 2002

(54) ICHTHYOLOGICAL RESUSCITATION APPARATUS

(76) Inventor: Walter S. Schytte, 2909 Trentwood Blvd., Orlando, FL (US) 32812

( * ) Notice: Subject to any disclaimer, the term of this patent is extended or adjusted under 35 U.S.C. 154(b) by 0 days.

(21) Appl. No.: 09/455,059

(22) Filed: Dec. 6, 1999

(51) Int. Cl.[7] .......................... A01K 91/00; A01K 95/02
(52) U.S. Cl. ..................................................... 43/43.12
(58) Field of Search .............................. 43/43.1, 43.15, 43/17.2, 42.49, 43.12

(56) References Cited

U.S. PATENT DOCUMENTS

| | | | | |
|---|---|---|---|---|
| 2,359,588 A | * | 10/1944 | Shea ........................... | 43/43.12 |
| 2,790,265 A | * | 4/1957 | Flynn .......................... | 43/43.1 |
| 2,988,395 A | * | 6/1961 | Rogers ........................ | 43/43.12 |
| 3,068,605 A | * | 12/1962 | Munsinger ................... | 43/43.12 |
| 3,605,319 A | * | 9/1971 | Griffith ....................... | 43/43.12 |
| 3,986,287 A | | 10/1976 | Arteaga ........................ | 43/5 |
| 4,598,492 A | | 7/1986 | Stanfield ...................... | 43/5 |
| 4,934,089 A | | 6/1990 | Samar .......................... | 43/5 |
| 4,965,955 A | | 10/1990 | Campbell et al. ............. | 43/4 |
| 5,482,195 A | | 1/1996 | Hobbs .......................... | 43/55 |
| 5,704,156 A | | 1/1998 | DiLello ........................ | 43/5 |

OTHER PUBLICATIONS

Reef Fish Survival Studies, pubished by Sarasota, FL: Mote Marine Laboratory, Spring/Summer 1999, vol. 1, 6 pages.
Bohnsack, Jim, "Alternative Method for Returning Fish to Sea", affiliated with National Marine Fisheries Service Miami Lab, Internet: ABC News, Oct. 1, 1999.
Richey, Warren, "Fish Traps Under Fire", Big Push for Ban as Fish Stocks Dwindle, Internet: Christian Science Monitor, Sep. 22, 1999.

* cited by examiner

Primary Examiner—Kurt Rowan
(74) Attorney, Agent, or Firm—Davis & Bujold, P.L.L.C.

(57) ABSTRACT

A fish reviver for reviving deep water fish brought up from depth by reintroducing them to deep water. The fish reviver is attached to a deep sea fishing rod, and an appropriate weight, depending upon the fish's size, is attached to the reviver. A hook member on the reviver is then inserted through the fish's gills and out of the mouth and then secured in place by a clasp. The fish is then lowered over the side of the boat into the water and then the weight is lowered into the water at which point the weight pulls the fish on the fish reviver down while also opening the clasp. The fish remains attached to the hook member due to the force of the water and friction caused by the downward pull of the weight and the inverted positioning of the hook member as well as owing to the fish's incapacitation caused by the exposure to the life threatening environment, e.g. pressure differential from depth to surface. The line is allowed to free spool until a desired depth is reached at which point the fish will regain its senses and can swim off the unclasped hook member or the line can be yanked causing the hook member to be removed thereby allowing the fish to recuperate at depth while allowing the recovery, in either case, of the fish reviver.

12 Claims, 5 Drawing Sheets

ICHTHYOLOGICAL RESUSCITATION APPARATUS

FIELD OF THE INVENTION

This invention relates to an apparatus for facilitating the resuscitation of deep water fish brought up from depth by releasably reintroducing them to deep water with as little physiological trauma as possible by use of a fish reviver, releasably securing a fish to an appendage thereof, and quickly lowering the fish back downward into the water to substantially the same depth from which the fish was initially caught.

BACKGROUND OF THE INVENTION

For years fishermen have caught fish of every species and size wherever and whenever they chose, however, with the rising demand for fish by consumers around the world has come a reciprocal drop in the availability of many species and, in particular, with the portions of the species mature enough to reproduce and perpetuate the species. It has become the case that quite often fishermen must return particularly undersized fish back to the ocean because they were either not big enough to provide substantial sport or food or they must be released to encourage the further growth and breeding of the species. Recently the increase of both commercial and sport fishing has prompted government regulations at both state and federal levels, often making it illegal to catch and keep undersized and/or immature fish.

Deep sea and sport fishing often involves the catching of fish from substantial depths, in particular depths wherein the water pressure is a significant environmental factor effecting the fish's physiology. The depth at which such fish are caught can range down to depths in the hundreds of feet which presents a particular problem with the return of undersized or immature fish which are required or desired to be returned to their original environment.

In particular, as is well known in the art, the retrieval and capture of any fish from deep water causes a substantial decrease in the surrounding pressure effecting the fish as it is brought to the surface of the water, resulting in a rapid decompression of the fish. Such a decrease in pressure over a short amount of time causes significant physiological changes in the fish. Fish brought up quickly from depth are particularly susceptible to ruptured swim bladders, bloated bodies and distended organs when the compressed air at depth expands substantially as the fish is bought to the surface.

The swim bladder of a fish is essentially a buoyancy tank containing an amount of compressed air or gas and used by the fish to regulate its depth. A fish is weightless in water (neutrally buoyant) where the size of the swimbladder is 5 to 7% of its total body volume. Normally, as a fish changes depth, the swimbladder inflates to the correct volume to equal the pressure of the water. Pressure typically increases by 1 atmosphere every 33 feet of water depth. From the surface to 33 feet, the pressure is 1 atmosphere (14.7 lbs/sq. in.). At 34 feet, the pressure increases toward 2 atmospheres, etc. Following the laws of physics and the expansion of gases under pressure, the swimbladder gases compress with increased pressure and expand when the pressure decreases. Therefore, as the fish swims down, the pressure increases, the swimbladder gases compress, and the fish becomes heavier than water. As the fish swims toward the surface, it needs to become lighter, so the swimbladder gases expand as the pressure decreases.

Under normal conditions, diffusion of swim bladder gases through the blood capillary system, is effective. The problem arises when the fish is brought rapidly to the surface from any appreciable depth. The swim bladder gases expand, due to the fairly rapid changes in pressure, at a rate at which the fish's physiology is unable to compensate and the swim bladder ruptures. Rapid expansion of the swim bladder gases can lead to bloating, ruptured swim bladders, and in some cases protrusion of internal organs and eyes, and embolisms. As is to be expected, such physiological changes in a fish are detrimental to its survival and timely re-introduction of the fish to its capture depth is necessary in order to increase any chance of survival.

These physiological changes, in particular the rupture of the swim bladder, cause release of the fish at the water surface to be particularly futile. With its swim bladder ruptured and its body distended and inflated, the fish cannot sink or swim back down to its capture depth. Furthermore, the fish becomes more disoriented and lethargic the longer it is kept at the surface of the water due to rapid decompression and the substantial pressure differential and therefor, in order to survive must be timely reintroduced to substantially the same depth from which it was caught.

Previous methods of re-introducing the fish to a capture depth and relieving the pressure within its body have proved only marginally effectual and added further soft tissue damage to the fish. One method punctures the fish's body cavity with a sharp object such as a hypodermic needle or a knife to relieve the pressure and merely drop the fish back into the water. As can be appreciated, relieving the pressure within the fish in such a manner may enable the fish to sink down into the water but will obviously cause further trauma to its soft tissue. If the fish is lucky, it might survive and be able to swim back to depth where it may revive, however, on the surface it is still disoriented and may not have the presence of mind or the ability to swim back downwards to depth. Furthermore, even if the fish is able to swim back down to depth and revive for a time, the puncture wound can easily become infected or the wound will trigger other fish to consume the wounded creature and the fish will only survive for a short period of time.

Another method leaves the fish on the hook and a fisherman simply adds a weight to the line and returns the fish back down to depth still on the hook, however the problem arises in that the fisherman must then get the fish off the hook at a desired depth. This is accomplished by trailing the line, hook and fish at depth behind the boat, the fisherman quickly throttles the boat forward to a high speed such that the hook is yanked from the fish's mouth. As is to be expected, this too causes trauma and damage to the fish which makes survival of the fish particularly tenuous.

SUMMARY OF THE INVENTION

Wherefore, it is an object of the present invention to overcome the above noted drawbacks associated with the prior art devices.

It is another object of the present invention to provide a simple, reliable and effective apparatus for returning a fish to a depth from which it was initially caught.

Another object of the invention is to provide a simple apparatus which does not increase the physiological damage to the fish caused by its capture and removal at a desired depth.

Still another object of the invention is to provide a cheap and efficient apparatus which can be used by any sport and commercial fisherman with little instruction or skill.

A further object of the intention is to provide a reviver which is easily utilized by a single fisherman or perhaps with the assistance of a partner to easily return fish to the same depth from which it was initially captured.

A still further object of the invention is to provide an apparatus which can be quickly attached and detached from a fishing line such that return of the fish to the proper capture depth takes a minimal amount of time and effort.

The present invention relates to a fish reviver for reviving deep water fish brought up from depth by reintroducing them to deep water whereby the fish is rapidly recompressed. The fish which has been caught and brought to the surface, and which must be returned, is attached, via an inverted hook mechanism on the fish reviver having a securing catch to releasably affix the fish to the reviver. The fish and fish reviver are then attached to a free spinning rod and reel and returned via a weight pulling the reviver and fish downward to depth from the free spinning rod and reel to approximately the depth from which the fish was taken. The weight further causes the catch to be opened and thus the fish, upon being reentered to substantially the depth from which it was taken, is sufficiently revived and capable of naturally swimming off the inverted hook in a normal swimming motion.

BRIEF DESCRIPTION OF THE DRAWINGS

The invention will now be described, by way of example, with reference to the accompanying drawings in which.

DETAILED DESCRIPTION OF THE PREFERRED EMBODIMENT

Figure 1:
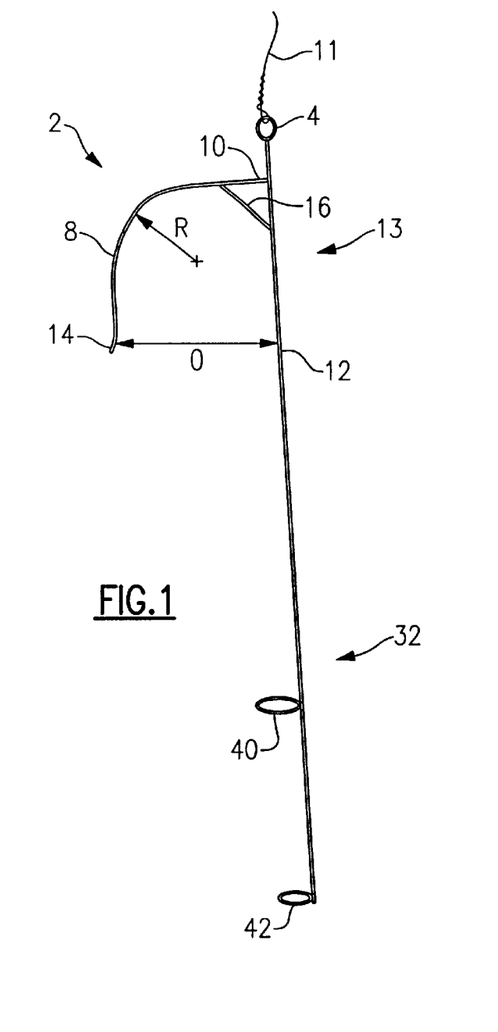
FIG. 1 is a diagrammatic view of the main body of the fish reviver as well as the gill hook and specific eyelets and attachments.

Referring now to FIG. 1, the fish reviver 2 incorporates a main body 12 serving as a main structural support for the fish reviver 2. The main body 12 is generally a rigid member, for instance a substantially rigid elongate wire, rod or pole supporting a number of appendages, connection points and eyelets which will be discussed in further detail below, for facilitating attachment to a fishing line 11, and return and revival of a fish to an appropriate capture depth and pressure underwater in conjunction with a fishing rod and by an attaching fishing line and spinning reel.

The main body 12 may be fabricated from any number of conventional materials such as fiberglass, metal, carbon fiber, plastic or any similar material with at least a desired amount of rigidity and has rust resist capabilities. The main body 12 is intended to be attached to the working end of a fishing line 11 of a fishing rod and spinning reel (not shown). The fishing line 11, rod, spinning reel and fishing line are well known in the art and thus no further discussion concerning the same is provided herein.

An extreme end of an upper portion 13 of the body 12 is attached to the fishing line 11, via a fishing line eyelet 4, hole or loop or substantially similar device such as is well known in the art. The fishing line 11 may have a snap swivel (not shown) to facilitate attachment of the reviver 2 to the fishing line 11 or the working end may be threaded through the eyelet 4, loop or hole and a commonly known fisherman's knot fitted or tied by the user. Other attachment means that are well known in the art may be used to secure the working end of the fishing line 11 to the fishing line eyelet 4, loop or hole on the upper portion 13 of the body 12.

The main body 12 is flexibly supported via the line eyelet 4 and dangles at the working end of the fishing line 11. As it will be understood by one of ordinary skill in the art, the fisherman attaches and allows the reviver 2 to dangle at the end of the line 11 in order that it can be loaded with a fish, as will be discussed in further detail below, and maneuvered back into the water to return a caught fish back to its capture depth.

The fish is attached to the reviver 2 by means of a gill hook 8. The main body 12 supports the gill hook 8 on the upper portion 13 thereof adjacent the fishing line eyelet 4. In a working position, as the main body 12 dangles from the fishing line via the line eyelet 4 as described above, the gill hook 8 includes an attached end 10 integrally formed with or fixed, via any conventional means such as brazing, welding, crimping and/or wind binding as is known in the art, to the main body 12, and a free end 14 projects radially outward and is then bent and extends parallel to the main portion of the main body 12. The attached end 10 of gill hook 8 extends substantially perpendicular from the main body 12 then turns downwards around a desired radius of curvature R to form the depending, downwardly pointing, free end 14. The free end is spaced from the main body 12 to define a mouth or opening O therebetween.

Thus, as can be readily ascertained by a person of ordinary skill in the art, the body 12 and gill hook 8 appear substantially as an inverted or upside down fish hook such that the free end 14 of the hook faces downwards toward the water, and not upwards, out of the water, as with conventional fish hooks. Additionally, the free end 14 is in general not sharp and is not intended to penetrate any tissue of the fish and is also free of any barbs or hindrances as are known in the art which would impede the release of the fish therefrom. In fact, the end 14 is smoothly rounded and shaped to ease the loading and release of the fish through the fish's gills with the gill hook 8 which will be described in detail below.

The gill hook 8 may be made of the same or different material as the body 12 and may be manufactured separately and attached to the main body 12 or formed integral therewith. The free end 14 should also have a certain amount of flexibility with respect to the main body 12 so that at least a minute amount of variance in the opening O may be achieved for reasons which will be further discussed below. The gill hook 8 can also be formed in several different sizes to accommodate different size or species of fish just as conventional fish hooks come in a myriad of different shapes and sizes.

Furthermore, a brace 16 may be added at the attachment end 10 such that at least a base of the attached end 10 of hook 8 is held in relatively firm fixed relationship with respect to the main body 12 while still enabling the free end 14 to achieve the desired flexibility with respect to the body 12 as discussed above.

Figure 1A:
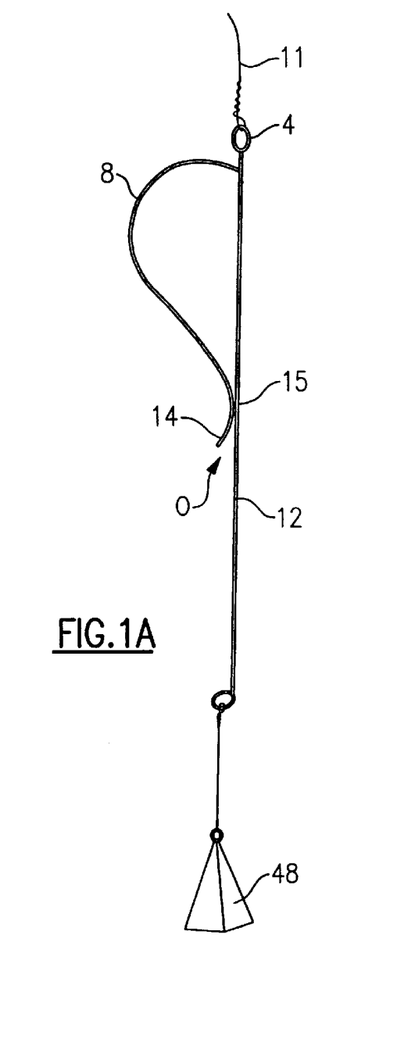
FIG. 1A is a diagrammatic view of an alternate form of the gill hook normally biased into contact with the main body of the retriever.

It is to be appreciated that the gill hook 8 could take any number of different bent formations or configurations. For instance, as shown in FIG. 1A, the gill hook 8 may, after radially extending outwardly from the attachment point 10 with the main body 12, then extend parallel to the body.

The free end 14 then curves back toward the main body 12 and engages with the main body 12 at a contact point 15. The contact point 15 is spaced from the attachment point 10 a sufficient distance to accommodate at least one fish on the gill hook 8. According to this embodiment, the opening O, defined between the free end 14 and the body 12, is actually reduced to zero. When a sufficient radial force is applied to the free end 14, an opening O is created, between the free end 14 and the contact point 15 with the main body 12, to allow a fish, via the fish's gills, to either be loaded upon or extracted from the gill hook 8. It is readily apparent to one of ordinary skill in the art that a fish being loaded upon the gill hook 8 would be temporarily retained thereon until a significant upward pull on the fishing line 11 would cause the biased free end 14 of the gill hook 8, engaging the contact point 15, to be moved radially outward away from the contact point 15 and the body 12, thus creating an opening O enabling the fish to swim free or to be slid off from the fish reviver 2.

Figure 2:
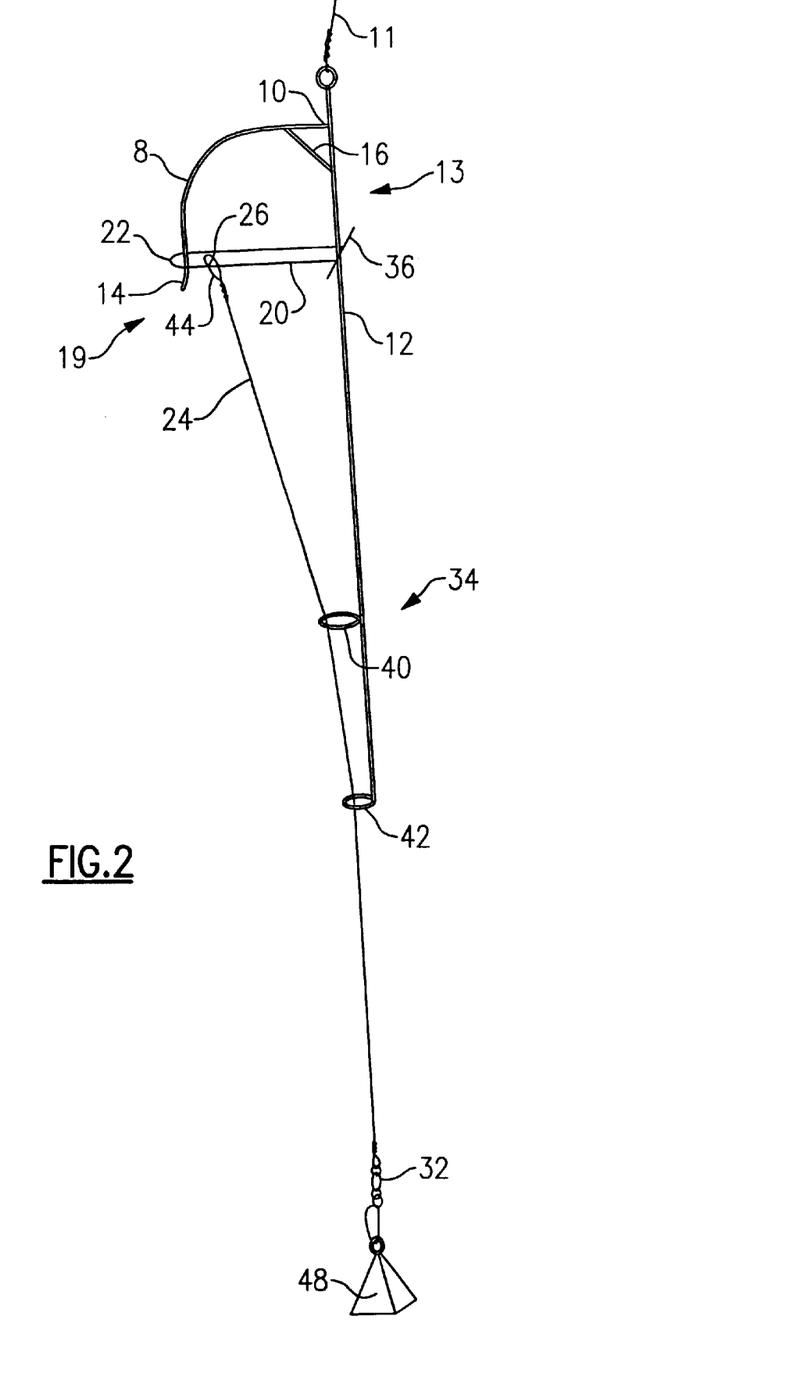
FIG. 2 is a diagrammatic view of the fish retriever showing a gate for opening and closing the fish reviver such that a fish may be either releasably captured or released from the reviver.

Turning now to FIG. 2, attached to the body 12 is a release mechanism 19, which when utilized with the above described body 12 and gill hook 8 enables the closure of opening O whereby a fish having been loaded on the gill hook 8 is releasably entrapped thereon. The release mechanism 19 has a closed position in which the fish is securely held on the gill hook 8, and an open position in which the fish is allowed to swim free of or be pulled off the gill hook. Further specific embodiments of the release mechanism 19 and the open and closed positions thereof will be described below.

The release mechanism 19 may be a rotating hinge gate 20 rotatably affixed to the body 12 and having a hook engagement end 22 for enabling a releasable engagement with the free end 14. The hinge gate 20 is rotatably affixed to the body 12 via a hinge pin 36 also supported on the upper portion 13 of the body 12 of the device. The hinge pin 36 is generally adjacent the attached end 10 of the gill hook 8 a sufficient distance to enable the hinge gate 20 to rotate freely about an angle of at least approximately 90 degrees between the body 12 and the free end 14 of the gill hook 8 to facilitate opening and closing of the of opening O.

The hinge pin 36 may be merely a pin or like device secured to the main body 12 via, for example, a hole drilled in the body through which the pin 36 passes and in which it is allowed to rotate or any other conventional swingable attachment means as is well known in the art may be utilized as well. As can be readily ascertained, the hinge pin 36 may be located at any point along the main body 12 from where a desirable rotation will most beneficially enable engagement and disengagement of the hinge gate 20 with the free end 14 of the gill hook 8.

The engagement end 22 of the hinge gate 20 works in releasable engagement with the free end 14 of the gill hook 8. When in an engaged position, the engagement end 22 of the hinge gate 20 is retained by an expansion force or tension of the free end 14 of the gill hook 8 and the hinge gate 20 lies substantially perpendicular between the free end 14 and the hinge pin 36 across the opening O, such that the opening O is closed and for instance a fish hooked to the gill hook 8 is releasably retained thereon. When in a disengaged position, the swingable hinge gate 20 is pulled or withdrawn from engagement with the free end 14 so that the gill hook 8 and free end 14 are unobstructed and the opening O is open, and for instance the fish releasably retained thereon may slide freely off the reviver 2, past the free end of the hook 8.

Specifically, the hinge gate 20 forms an elongate U-shaped loop defining the engagement end 22 and the hinge end. The engagement and the hinge ends are spaced apart at the same or lesser length than the length of the opening O. The hinge end is attached, on either side of the main body 12 to the rotatably affixed hinge pin 36. The closed engagement end 22 of the elongate U shaped loop defines the engagement end 22. As can be appreciated by one of ordinary skill in the art based upon the length of the hinge gate 20 being equal to or less than that of the opening O, the engagement end 22 forms a snap or frictional engagement over and at least partially encompassing the free end 14 of the hook 8.

As is to be appreciated, the engagement end 22 of the hinge gate 20 may be slid over the free end 14 of the gill hook 8 due to the relatively flexible gill hook 8 as described above. The free end 14 of the gill hook 8 thus provides a frictional outward bias upon the closed end of the elongate U-shaped loop forming the engagement end 22 thus biasly supporting the hinge gate 20 in the closed position for releasably capturing or retaining a fish placed on the gill hook 8 for eventual revival at a desired depth.

Prior to release of the fish from the gill hook 8, the hinge gate 20 must be forced or influenced into the open position. For this purpose, a leader 24 is spaced from the hinge pin 36 and attached at a point along the swing gate 20 generally adjacent the hook engagement end 22 of the hinge gate 20. The leader 24 is attached at a first end via a loop or knot, or some other conventional coupling, to the hinge gate 20 at the desired point along the hinge gate 20, for instance a cross brace 26. The leader has an opposed second end at which a desired weight 48 is attached via any conventional means such as a snap swivel 32 or any general fisherman's knot as is known in the art.

The leader 24 is generally made of any reasonably durable low, medium or high test fishing line and may be anywhere from several inches to several feet in length depending upon, the size or the reviver 2, the type of fishing being released, the depth at which the fish is to be lowered to, size of the fish, or even the size of the boat. Specifically, the leader is fixedly attached to a cross brace 26 of the hinge gate 20, the cross brace being spaced from but relatively adjacent the engagement end 22 of the hinge gate 20. Such a location facilitates the release of the hinge gate 20 from its engagement with the free end 14 of the gill hook 8 when the weight is allowed to fall downward pulling the engagement end 22 away from the frictional biased engagement with the free end 14. The placement and attachment of the leader 24 adjacent the engagement end 22 facilitates a particular desired force and leverage on the hinge gate 20, thus opening the hinge gate, and ensuring that the hinge gate 20 opens and continues to remain open and allow a fish on the hook to be timely released.

As can also be appreciated with the leader 24 attached to the cross brace 26 of the hinge gate 20, when the weight is allowed to fall downward, due to the force of gravity, the weight 48 is of sufficient mass to pull the engagement end 22 of the hinge gate 20 away from the outwardly biasing influence of the free end 14 of the gill hook 8 and thus open the gill hook 8 such that a fish can be unimpededly released therefrom. A further description of the release of the fish from the gill hook will be provided below.

The leader 24 is held in a relatively horizontally restrained position substantially parallel to the main body 12 by at least one and preferably first and second guidance eyelets 40, 42 supported longitudinally along a lower portion 34 of the main body 12. The first and second eyelets 40, 42 are spaced downwards along the main body 12 from the hinge pin 36 such that they will not interfere with operation of the hinge gate 20 and hinge pin 36 no matter which position the hinge gate 20 is in, e.g. the open or the closed position. The eyelets 40, 42 present vertically aligned apertures through which the leader 24 is threaded. The eyelets 40, 42 ensure that the full force of the weight is directed substantially axially along the reviver 2 to open the hinge gate 20 and the eyelets 40, 42 also minimize or eliminate any sway or horizontal movement in the leader 24.

The weight 48 is variable and can be easily changed due to the use of the snap swivel 32 on the leader 24. The amount of weight needed to lower a fish will generally be dictated by the size of the fish and the capture depth to which the fish is to be returned. However, a substantial amount of pressure change when descending underwater is accomplished in the first 32 feet below the surface of the water. Thus, a fish does not need to be returned to exactly the same depth from which it was initially captured but need only be returned approximately close to the same capture depth to provide a substantially improved chance for recovery and survival. Therefore, the choice of weight and length of the leader line are important but not completely critical to proper use of the device and an estimation by the fisherman is generally sufficient to provide adequate weight for returning the fish to a depth where its chances of survival are greatly improved.

Figure 3:
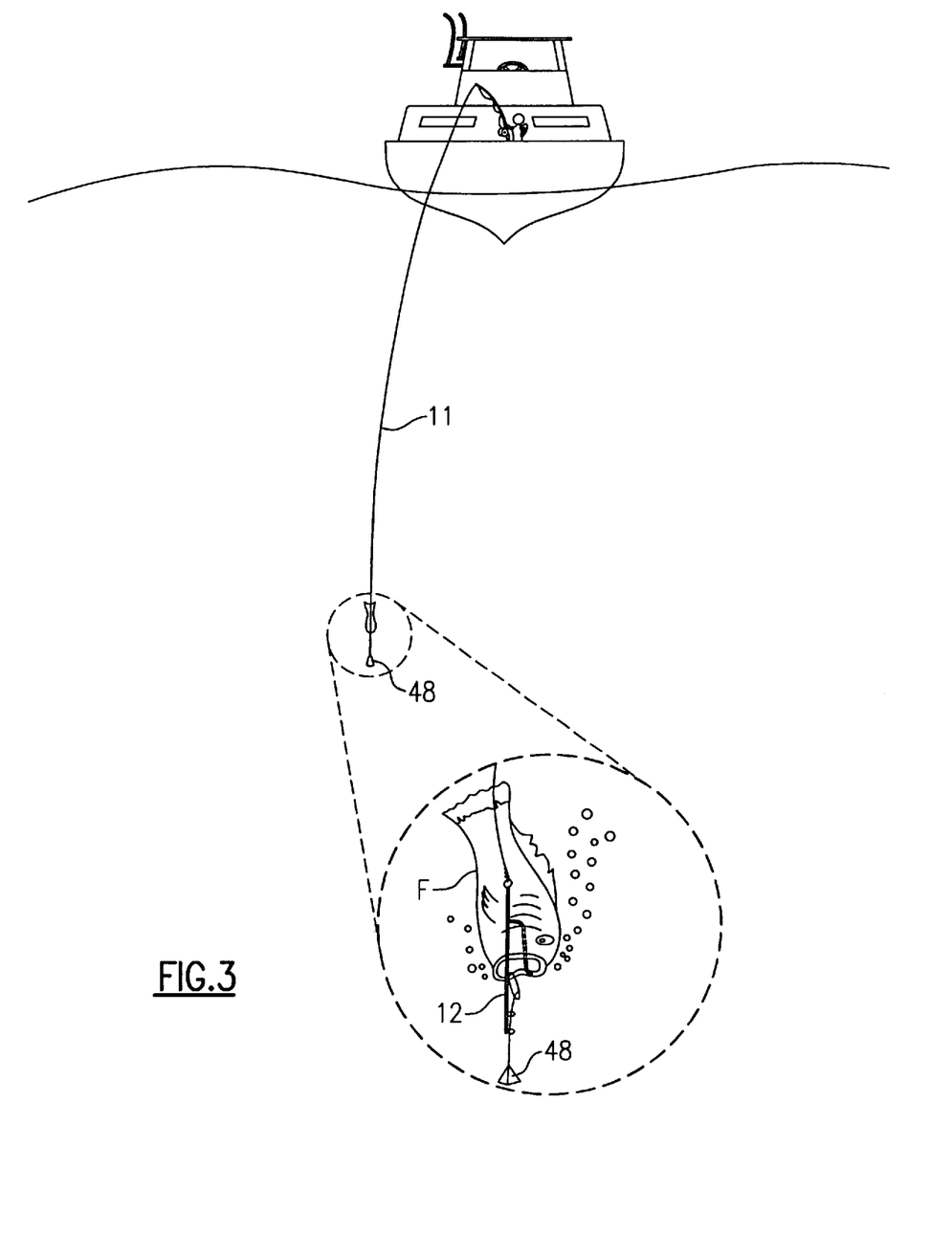
FIG. 3 is a diagrammatic exploded view of the fish reviver being utilized in combination with a fish and attached to a fishing line and utilized in combination with a fishing boat.

The above invention will now be further understood in connection with FIG. 3 and the manual loading and release of a fish in order to return the fish F to a proper depth and pressure. When a fisherman has caught a fish which must be released, due to it being undersized for instance, the fish reviver 2 is attached to the fishing line 11 of a rod and reel at the fishing line eyelet 4 as explained above. The hinge gate 20 is initially in the opened position whereby the free end 14 of the gill hook 8 will readily accept a fish. The fisherman, grasping the fish F in one hand and the reviver 2 in the other, inserts the free end 14 of the hook through the gills of the fish F from directly outside the body of the fish F through the fish's gill such that the free end 14 of the gill hook 8 will extend from inside the mouth of the fish, out of the mouth. The free end 14 thus extends out from the mouth of the fish F and whereby the hinge gate 20 is able to be closed by the fisherman via engagement of the end 22 with the free end 14 which functionally biases the hinge gate 20 in the closed position to secure the fish F on the reviver 2.

Next, the weight 48, is attached to the leader 24, but has not yet been applied and is either held by the user, set on the deck or the side of the boat such that the weight does not exert any influence to open the gate 20. With the fish F now releasably captured on the gill hook 8, the fish F and the fish reviver 2 may be gently lowered into the water by the fisherman. The fisherman then release the weight 48 into the water and generally sets the reel of the fishing rod set on free spin such that the downward force by the weight 48 will pull line 11 freely off the reel of the fishing rod.

The weight 48 performs two operations substantially simultaneously. The weight 48 firstly pulls the hinge gate 20 into the open position such that the gill hook is open and, at the same time, the weight 48 is pulls the fish reviver 2, as well as the fish, downward into the water toward bottom such that the fish F trails behind the fish reviver 2 still releasably retained upon the downwardly depending gill hook 8 (FIG. 3). The weight 48, the fish reviver 2, and the fish F thus captured and retained on the gill hook plummet downwards in the water towards a capture depth and pressure from approximately where the fish F was initially captured. The downward motion and inverted nature of the reviver and gill hook 8 work to keep the fish F generally retained on the gill hook 8. The fish F is brought down to substantially the same depth from where it was captured, at which point the pressure at which the fish F is normally accustomed to is restored and recuperation of the fish F begins fairly quickly to enable the fish F to again regain its normal physiological functions.

The fish, over a relatively short period of time, becomes revived due to the restoration of its proper pressure and, therefore, becomes more animated and is able to swim freely off the free end 14 of the gill hook 8. Even if the fish F is not completely revived, the fisherman's retrieval of the reviver 2 by reeling in the fishing line 11, to which the reviver 2 is attached, will tend to pull the gill hook 8 upward and cleanly out of the mouth and gills of the fish F, thus releasing the fish F at the returned depth with little or no tissue damage thereby increasing the fish's chances of survival.

Figure 4:
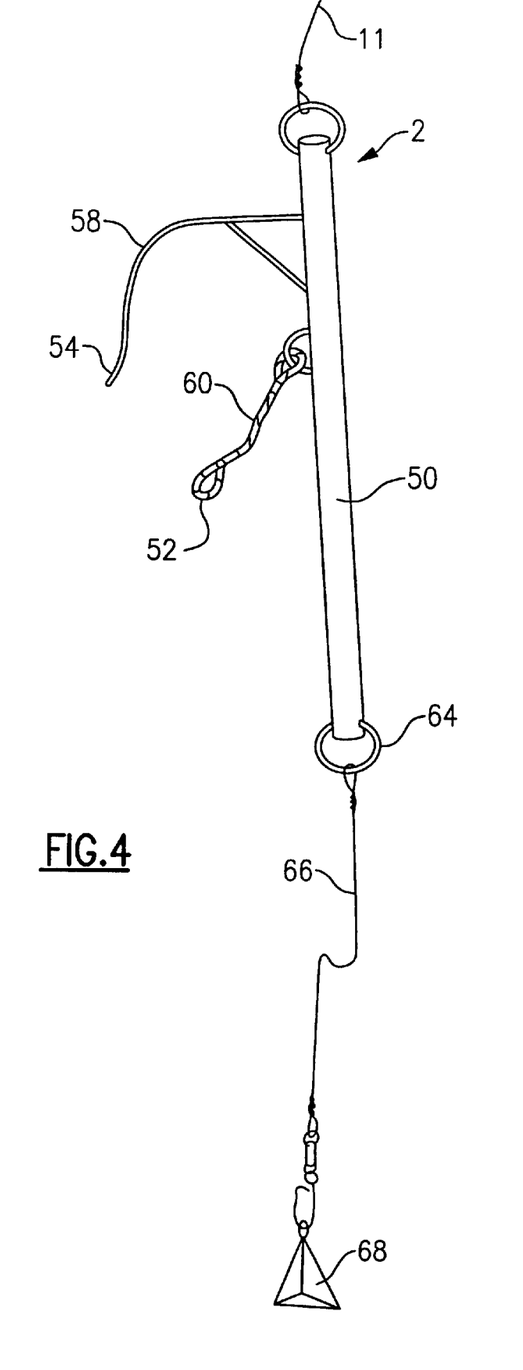
FIG. 4 is an alternative embodiment showing a reviver having a springable hook closure and rigid stanchion body.

Referring now to FIG. 4, a further embodiment of the present invention will now be described. The fish reviver 2 is augmented by having a substantially more rigid tubular body member 50 for instance a stanchion or pipe to which the various eyelets and hook are appended. The stanchion body 50 has, as described above, an inverted hook member 58 connected thereto via any manner of brazing, welding, crimping and/or wind binding as is known in the art. The inverted hook member 58 is connected to the stanchion body 50 relatively adjacent the upper end of the stanchion such that the stanchion is connected to a conventional fishing line 11. The hook member 58 extends outwardly from and defines a depending free end 54 pointing substantially downwards and parallel to the stanchion body 50. Attached to the stanchion body 50, opposite the free end 54, is a spring closure 60 which when extended includes a catch 52 for engaging with the free end 54 of the hook member 58.

The spring closure 60, when released, is substantially flexible and is allowed to dangle from the stanchion body 50 so as not to block or impede the open end of the hook wherein, as described above, the fish F would be allowed to swim off the free end 54. The spring closure 60 is extended by the fisherman once the fish F has been placed or loaded on to the inverted hook member 58, and catch 52 is connected to the free end 54 thus capturing or retaining the fish F on the hook member 58 to facilitate return of the fish F back into the water at an appropriate capture depth.

The stanchion 50 provides a substantially more rigid body support member and the spring closure provides a substantially less rigid more flexible closure member to facilitate release of the fish F and to close the open end of the hook. A weight 68 may be attached to the lower most end of the stanchion 50 by an eyelet 64 or leader 66 in order to ensure that the fish reviver is pulled downwards into the water toward the bottom, as described above.

The spring closure 60 for the gate is opened when the fisherman, having allowed the weight to pull the fish F to depth, provides only a slight tug upwards to cause the inertia of the fish F to push or bias the catch 52 and spring closure off the free end 54 and thereby release the fish F from the reviver 2.

In a preferred form of the invention, the free end of the hook member curves toward the body to facilitate mating engagement with the gate. The curved section also includes a small nub which the gate must pass over to lock the gate in its closed position. The nub facilitates retaining the gate in its closed position while still allowing the gate to pivot or move into its open position either due to the gravitational force of the weight or when a sufficient jerking force, in the opposite direction to that of the gravitational pull, is exerted by the fishing line connected to the fish reviver.

Figures 5, 6:
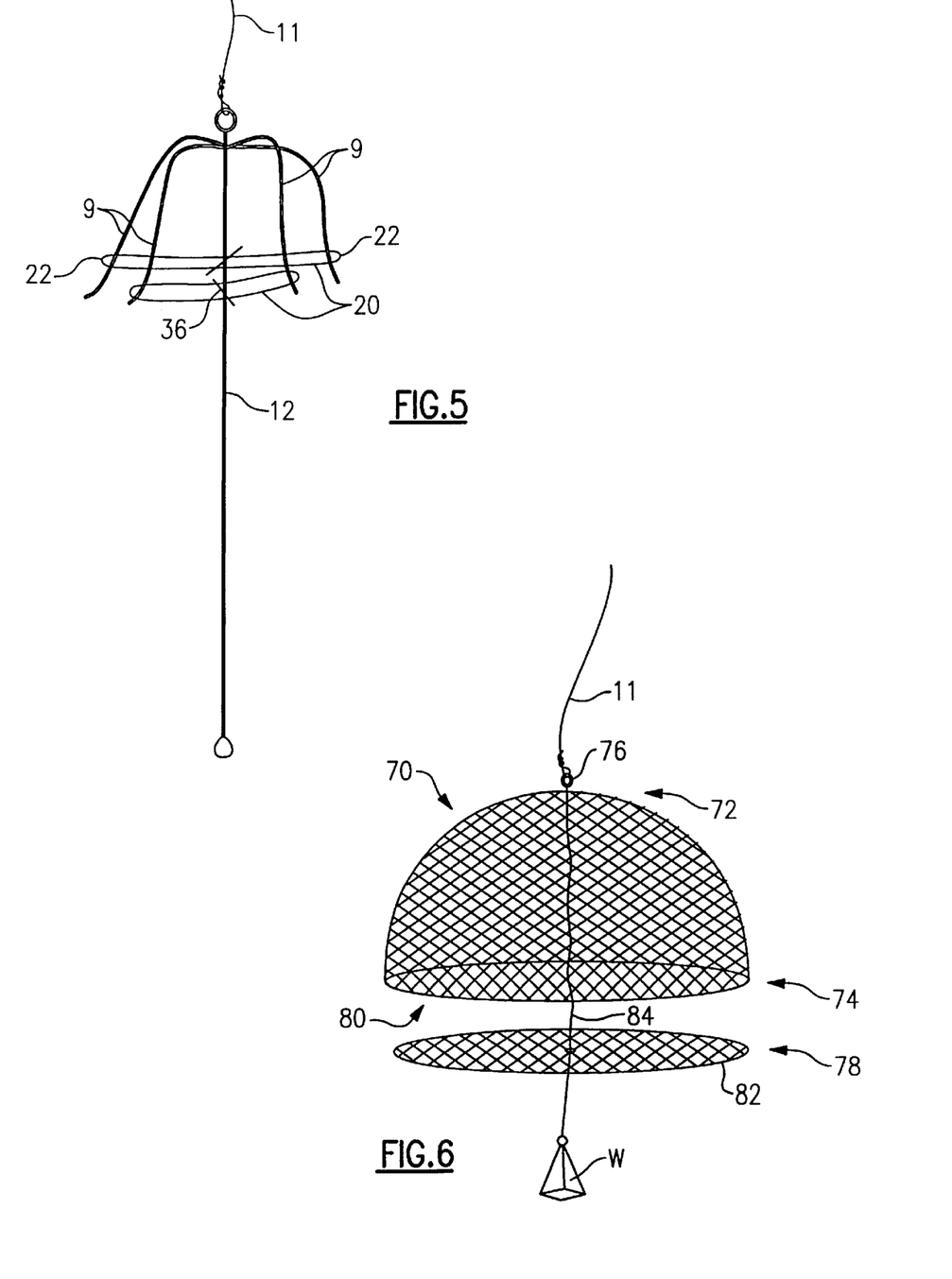
FIG. 5 is a diagrammatic view of the fish reviver body supporting a plurality of gill hooks for use in simultaneously returning a plurality of fish back to a desired depth.
FIG. 6 shows an alternative embodiment of the main body having a weighted basket and a cover for returning fish back to a desired depth.

It is to be appreciated that a plurality of hook members 9, as shown in FIG. 5, can be attached in a spaced relation about the exterior circumference of a single body, e.g.

spaced 90, 120 or 180 degrees apart from one another, to facilitate re-introducing two or more fish via a single fish reviver 2. As such feature would be readily apparent to those skilled in the art, a further description concerning the same is not provided.

Turning now to FIG. 6, a further embodiment of the present invention will be described. The fish reviver 2 takes the form of an porous inverted basket 70 (which functions as the fish retainer) having a closed first end 72 and an open second end 74. The first end 72 includes an eyelet 76, on an exterior surface thereof, for attachment to a free end of a conventional fishing line, as described above. The second open end 74 enables the insertion and extraction of at least one fish into and out of an interior cavity 80 defined by the basket 70. Cooperating in conjunction with the open end is the release mechanism 78, such as a removable cover 82, which is designed to have, when in a first closed position, a friction fit with the open second end 74 of the basket 70 to be releasably engaged therewith for temporarily retaining any captured fish within the cavity 80 of the basket 70. When release of the fish from the basket 70 is desired, the release mechanism 78 is designed to separate and disengage from the open end 74 to form an opening O and allow the fish to either swim free or otherwise be expelled or released from the open end 74 of the basket 70.

The cover 82 may itself be sufficiently weighted or may have a separate weight attached thereto, as shown in FIG. 6, in order to facilitate a momentum triggered disengagement of the cover 78 from the open second end 74 of the basket 70 once the descent of the basket 70 is stopped for some reason, e.g. by stopping the rotation of the fishing reel attached to the fishing line 11. As the cover 82 is only temporarily secured to the open end 74 of the basket 70, the cover's momentum is not stopped by stopping the rotation of the fishing reel. As such, the covers still continues its descent and becomes disengaged from the basket 70—either the inherent weight of the cover 82 or the attached weight W facilitates this. In a preferred form of the invention, a retaining line 84 provides retention of the cover 82 to the basket, subsequent to disengagement and release of the fish at a desired depth, to prevent loss and retrieval of the cover 82 following use. Preferably both the basket 70 and the cover 82 are sufficiently porous, e.g. formed of wire, screen, mesh, etc. to allow quick descent of the of fish reviver in water while still preventing undue drag when "reeling" in the fish reviver 2 following use.

Since certain changes may be made in the above described fish reviver, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A fish reviver comprising:
   an elongate body having an upper end and a lower end;
   a first eyelet attached to the upper end to facilitate tying the fish reviver to a free end of a fishing line and a second eyelet attached to the lower end of the elongate body;
   a hook having a first end connected to the body at a location adjacent the eyelet on the upper end of the elongate body, and a free end spaced from the elongate body;
   the fish reviver including a weight to facilitate returning a caught fish back to a capture depth;
   a clasp rotatably affixed to the body between the first and second eyelets for releasably engaging the free end of the hook; and
   a leader having a first and a second termination, the first termination of the leader is secured to the clasp and the second termination of the leader passing through the eyelet at the lower end of the body and is attached to the weight.

2. The fish reviver according to claim 1, wherein the clasp is attached to the body by a hinge pin rotatably affixed to the body.

3. The fish reviver according to claim 1, wherein the second termination of the leader has a snap swivel to attach the weight thereby facilitating the ease in which the weight may be changed.

4. The fish reviver according to claim 1, wherein a brace with a first and second end supports the attached end of the hook.

5. The fish reviver according to claim 1, wherein the body is stainless steel.

6. The fish reviver according to claim 1, wherein the leader is braided steel.

7. The fish reviver according to claim 1, wherein the leader can vary in length to compensate for differences in freeboard amongst boats.

8. The fish reviver according to claim 1, wherein the fish reviver includes a plurality of hooks attached to the body to facilitate returning a plurality of captured fish back to a captured depth.

9. The fish reviver according to claim 1, wherein the clasp is movable from an open position, which allows the fish to engage with the hook to a closed position, which facilitates retention of the fish on the hook, and the weight facilitates movement of the gate, into the open position, once the fish reviver is introduced into water to release the fish from the fish reviver.

10. The fish reviver according to claim 9, wherein a first end of the clasp frictionally engages with the free end of the hook to facilitate retaining the clasp in a closed position.

11. A fish reviver device for use with a fishing line, rod and reel to releasably secure and return a captured fish to a capture depth, at any desired point between a top surface and a bottom of a body of water, the fish reviver device comprising:
    an elongate body having a first end and a second end;
    an eyelet attached to the first end to facilitate tying the fish reviver to a free end of the fishing line, and an eyelet attached to the second end;
    a downwardly depending hook having a connected end connected to the body at a location adjacent the eyelet on the first end of the body, and a free end constantly spaced from the elongate body;
    a weight attached to the body to facilitate returning a captured fish back to its capture depth; and
    a gate substantially perpendicular to the body and having a first end hinged to the body, and a second end which may be releasably engaged substantially perpendicular to the body with the free end of the downwardly depending hook following insertion of the hook through the gills and mouth of the fish and wherein the weight is secured to the second eyelet to facilitate disengagement of the gate with the free end of the hook when the fish has been returned to a desired depth.

12. The fish reviver according to claim 11 further comprising at least a horizontally aligned third eyelet supported on the lower portion of the body and a leader having a first and a second end extending through the eyelet, the first end of the leader being attached to the gate and the second end supporting the weight.

* * * * *